United States Patent [19]

Haze

[11] Patent Number: 5,446,557
[45] Date of Patent: Aug. 29, 1995

[54] FACSIMILE MACHINE CAPABLE OF VOCAL AND PRINTED PRESENTATION OF CAPABILITIES

[75] Inventor: Toshiro Haze, Kasugai, Japan

[73] Assignee: Brother Kogyo Kabushiki Kaisha, Nagoya, Japan

[21] Appl. No.: 73,078

[22] Filed: Jun. 8, 1993

[30] Foreign Application Priority Data

Jun. 12, 1992 [JP] Japan .................... 4-179289

[51] Int. Cl.⁶ .................... H04N 1/21; H04N 1/00
[52] U.S. Cl. .................... 358/444; 358/468; 358/400
[58] Field of Search .............. 358/406, 404, 444, 468, 358/296, 401, 443, 434, 400; 379/100

[56] References Cited

U.S. PATENT DOCUMENTS 5,230,628  7/1993  Kaneko .................... 379/100
5,283,661  2/1994  Klees .................... 358/406

Primary Examiner—Scott A. Rogers
Attorney, Agent, or Firm—Oliff & Berridge

[57] ABSTRACT

In a facsimile machine having a random access memory for storing compressed image data received from a remote facsimile machine, there is provided a read-only memory in which stored are compressed sales presentation data and header information. The header information includes, for example, an encoding format information indicative of an encoding format used for producing the compressed presentation data, and is used when it is decoded and printed. The received compressed data and the compressed sales presentation data, both being encoded by the same format, are selectively decoded and printed. The printed presentation data contains a list of the functions and specification of the facsimile machine, for example. The presentation of the facsimile machine may be given vocally alone or in combination with the printed information.

19 Claims, 4 Drawing Sheets

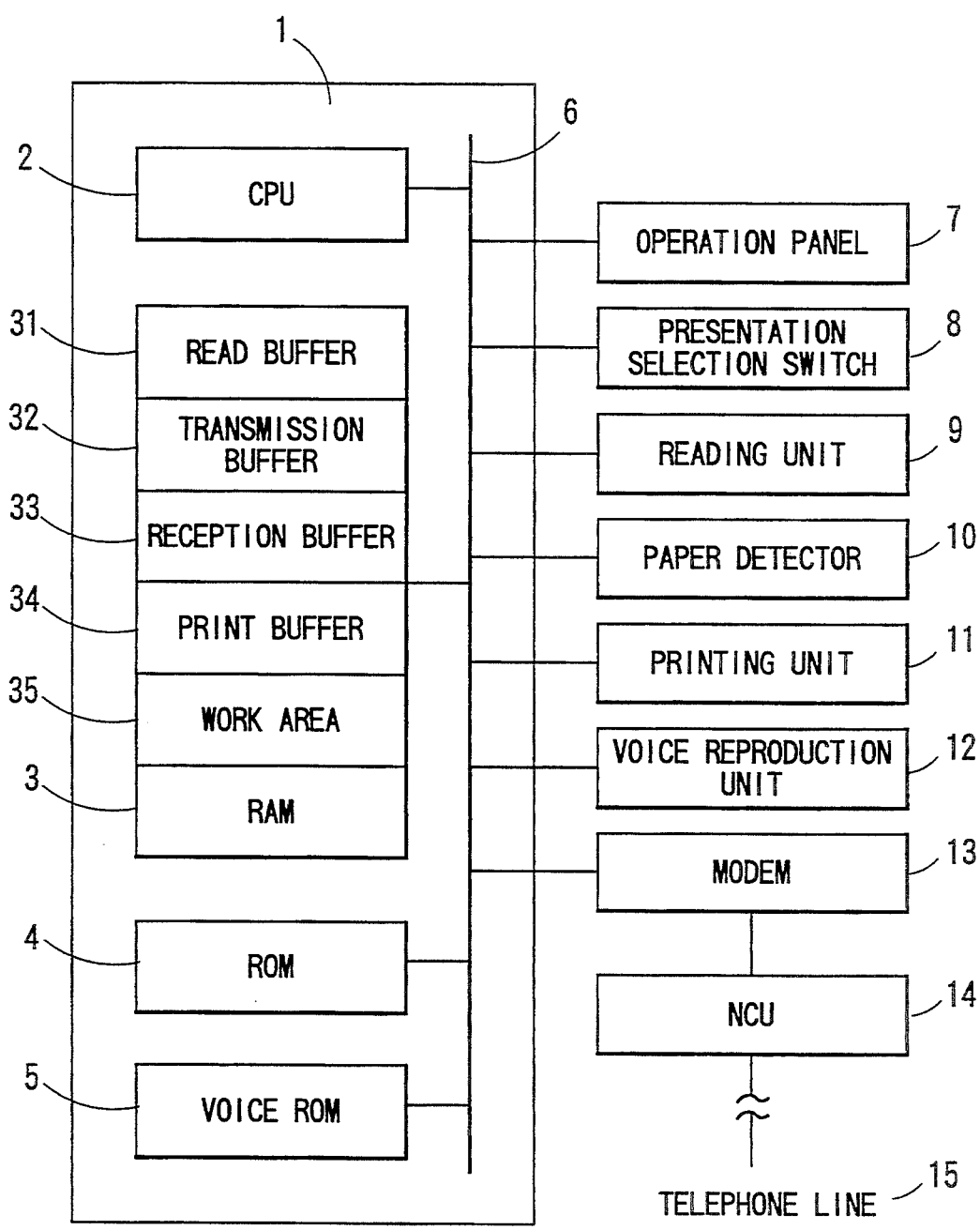

FACSIMILE MACHINE CAPABLE OF VOCAL AND PRINTED PRESENTATION OF CAPABILITIES

BACKGROUND OF THE INVENTION

1. Field of the Invention

The present invention relates to a facsimile machine, and more particularly to a facsimile machine capable of printing out previously stored image data.

2. Description of the Related Art

There has been described in Japanese Patent Application Kokai No. SHO-62-97874 a printing apparatus that has a copy of its operation manual stored in its ROM in the form of print data. If a user loses the original hard copy of the operation manual, the user can produce another copy of the operation manual by printing out the print data. There has been described in Japanese Patent Application Kokai No. SHO-62-26570 a printing apparatus with presentation information also stored in its ROM in the form of print data. The presentation information includes descriptions of special functions and features of the printing apparatus. During demonstrations for sales promotion of the printing apparatus, printing out the presentation data allows potential customers not only to see the quality of the printed characters produced by the machine, but also the special functions and features in list form on the printed out page.

However, facsimile machines are conventionally constructed for receiving, transmitting, or copying images and not for printing out previously stored data. In image reception, a facsimile machine receives compressed image data from a remote facsimile machine, decodes the compressed image data, and then prints out an image accordingly. In image transmission, after reading an image on an original document and compressing the data of the image, a facsimile machine transmits the compressed data to a remote facsimile machine. To copy an image, a facsimile machine reads an image on an original document, temporarily stores it in a memory as image data, retrieves the image data, and then prints out a copy of the image in accordance with the image data thus retrieved.

To introduce the functions and features of conventional facsimile machines or to show the quality of the printed characters to a potential customer, the copy mode of the facsimile machine has been used to copy, for example, a document containing a list of the functions and specifications. However, this has proven troublesome because the image must first be read by the scanner, the image data outputted from the scanner must then be temporarily stored in a memory, and the image must then be printed out on the same number of pages as the original document. Storing presentation data and then printing out pages with presentation information according to the presentation data, as has been done in word processors and printers, has proven economically unfeasible in a facsimile machine. This is because facsimile machines, unlike printers, use bit image data and so require a great amount of storage space for each page to be printed out. Accordingly, the amount of image data required for a normal letter-size piece of paper would take up a great amount of memory space. Moreover, the memory space would be consumed for a purpose not implicit for control of the machine. Depending on the memory capacity of the ROM used for control programs, adding a separate ROM might prove necessary, which would require adding extra space for locating the extra ROM and increasing the end price of the unit to cover the cost of the extra ROM.

SUMMARY OF THE INVENTION

The present invention has been made to eliminate the above-noted inconveniences and accordingly it is an object of the invention to provide a facsimile machine which can compress image data so as not to occupy a large memory space and print out the image data when required.

To achieve the above and other objects, there is provided according to the invention a facsimile machine comprising first storage means and second storage means. The first storage means stores compressed image data received from a remote facsimile machine, and the second storage means stores predetermined compressed image data and header information. The header information includes, for example, an encoding format information indicative of an encoding format used for producing the predetermined compressed image data, and is used for decoding and printing the predetermined compressed image data. There is provided decoding means for decoding the compressed image data and the compressed predetermined image data. There is further provided switching means for switching between a first mode and a second mode. In the first mode, said decoding means decodes the compressed image data stored in the first storage means, while in the second mode, said decoding means decodes the predetermined compressed image data stored in the second storage means. The facsimile machine has printing means for carrying out printing on a sheet of paper set on the facsimile machine. A control means is provided which controls the switching means to be switched between the first mode and the second mode, and further controls the printing means to carry out printing based selectively on the decoded image data and the decoded predetermined image data.

Preferably, there is provided third storage means for storing predetermined voice data, and voice reproduction means for reproducing a vocal message from the predetermined voice data. The vocal message is correlated with the predetermined image data. A selection selects an output mode from a first output mode producing a print of the predetermined image data, a second output mode reproducing the vocal message, and a third output mode producing a print of the predetermined image data and reproducing the vocal message simultaneously.

BRIEF DESCRIPTION OF THE DRAWINGS

The above and other objects, features and advantages of the invention will become more apparent from reading the following description of the preferred embodiment taken in connection with the accompanying drawings in which:

FIG. 1 shows in block form a control section of a facsimile machine according to a preferred embodiment of the present invention;

FIG. 2 shows pieces of information stored in a ROM for decoding image data; and

DETAILED DESCRIPTION OF THE PREFERRED EMBODIMENTS

Figure 3:
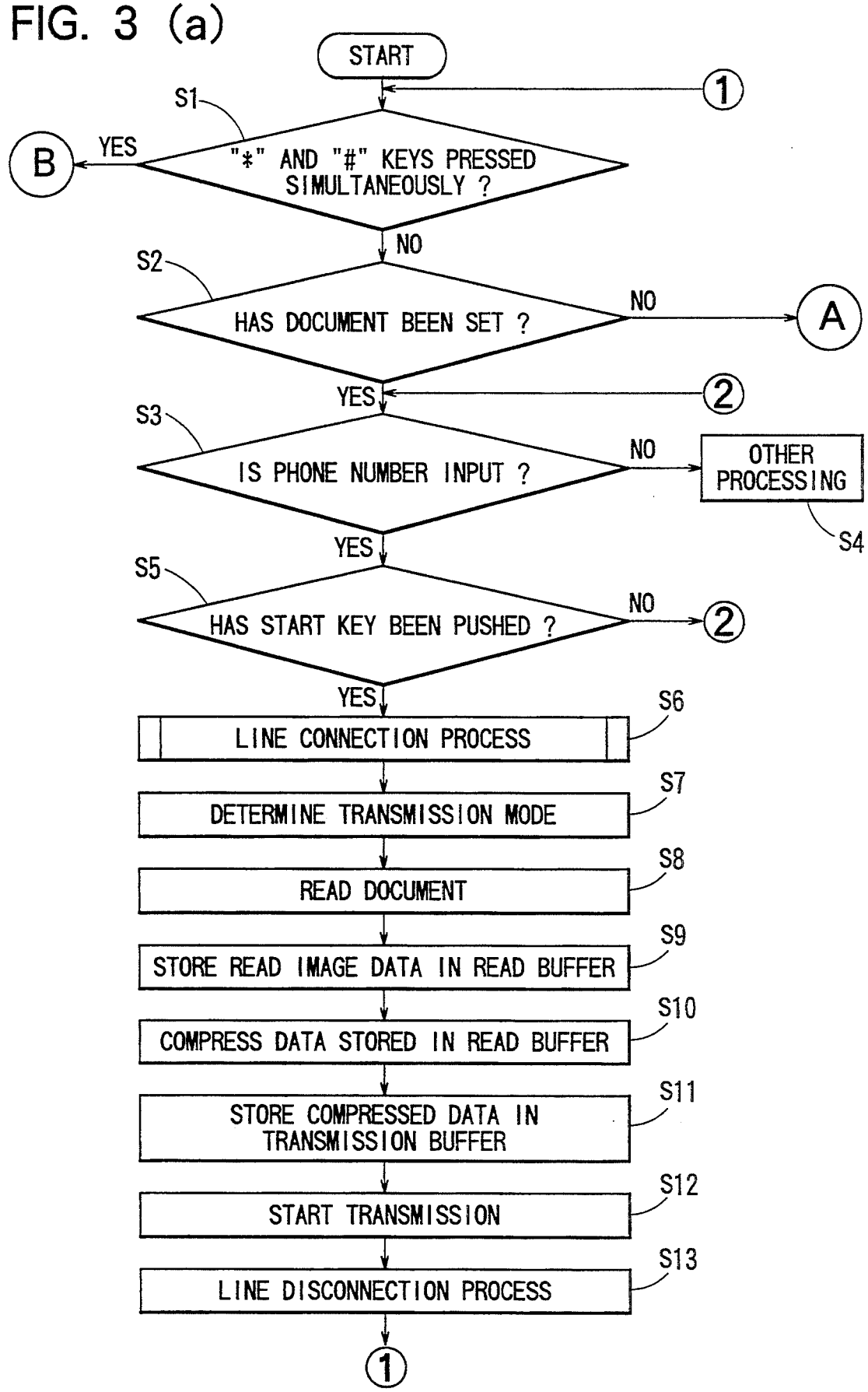
FIGS. 3(a) through 3(c) show in combination a flow chart representing operations in the facsimile machine according to the preferred embodiment of the present invention.
Figure 3:
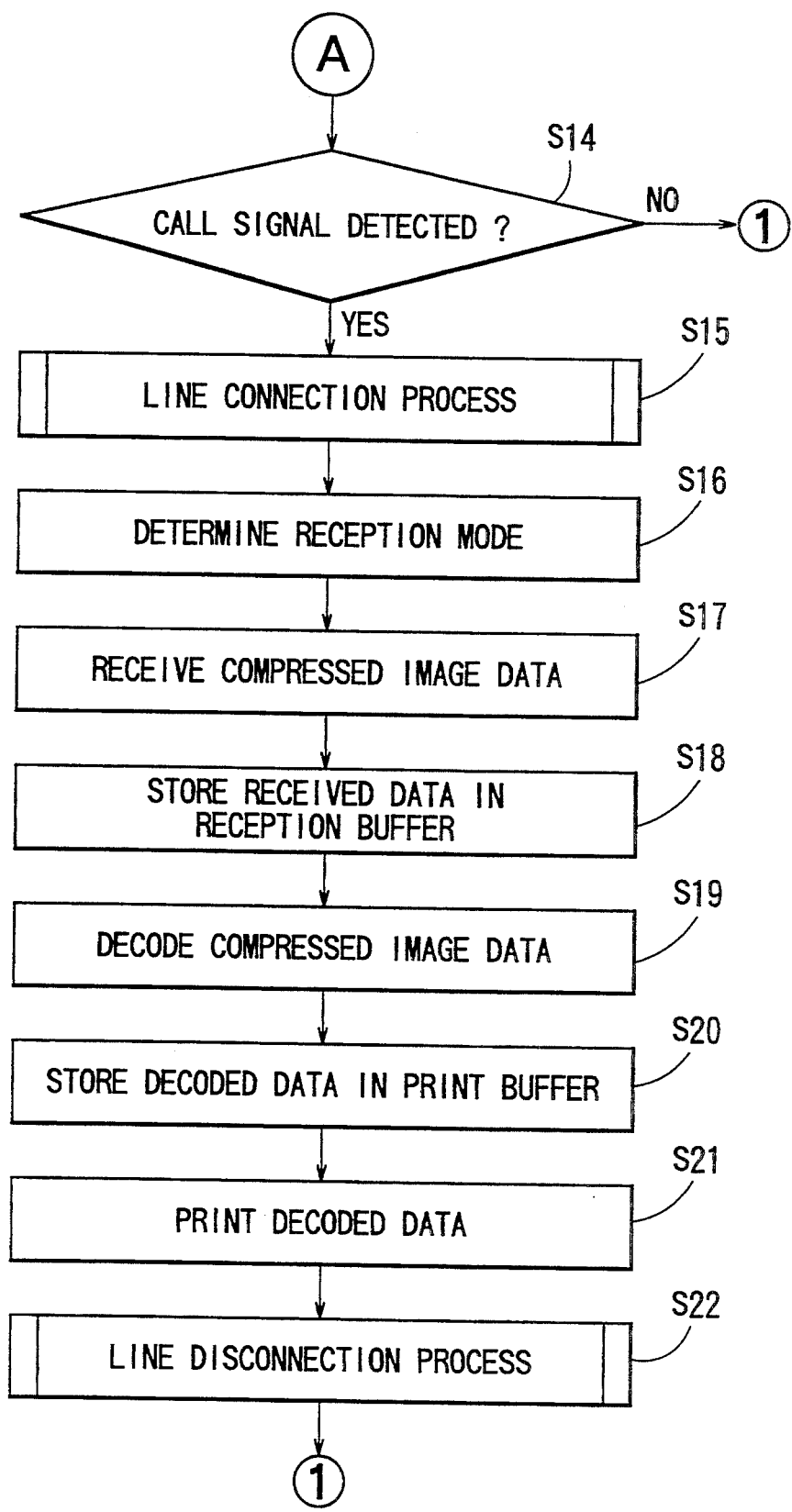
Figure 3:
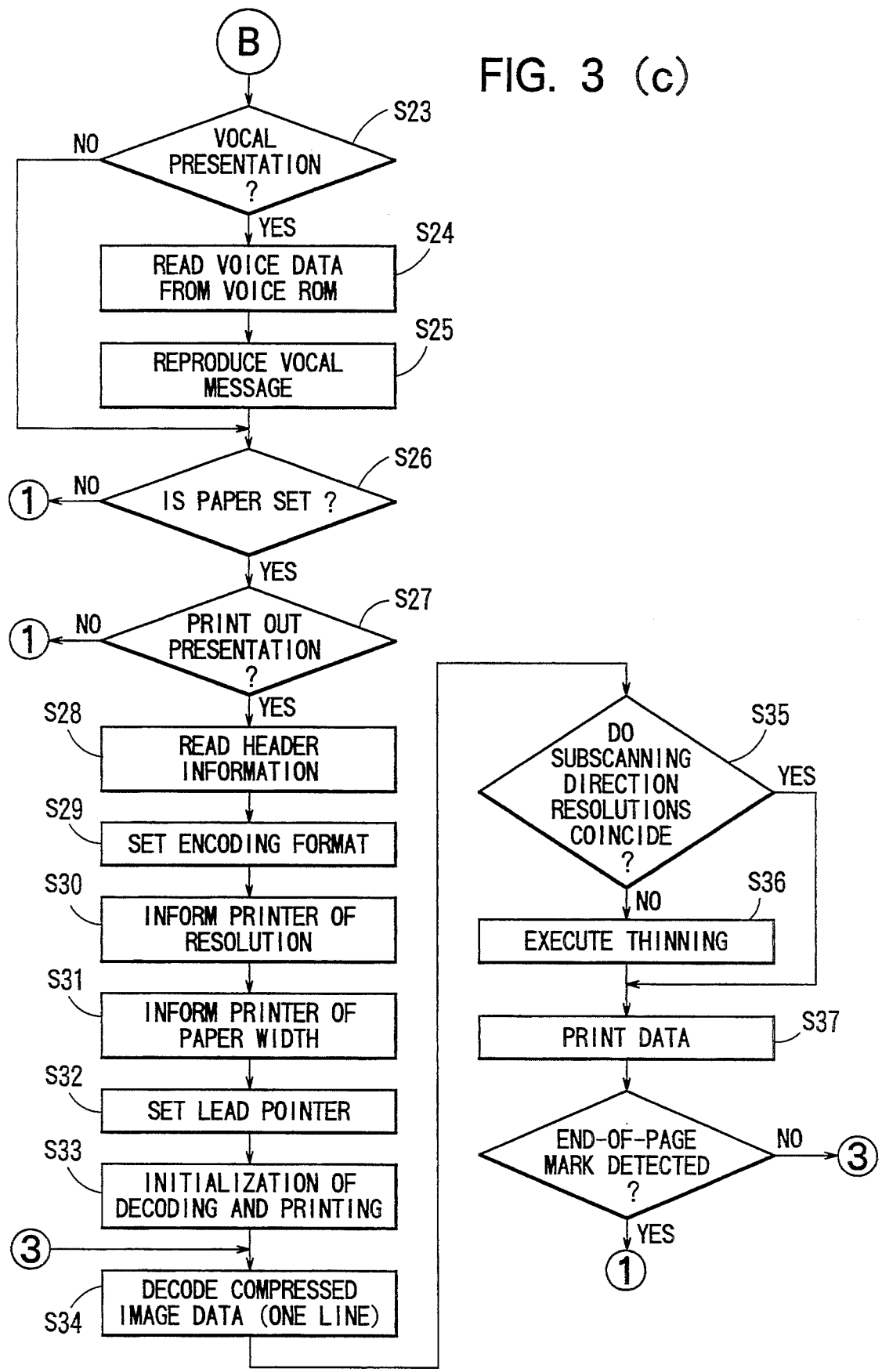

A facsimile machine according to a preferred embodiment of the present invention will be described while referring to the accompanying drawings.

As shown in FIG. 1, the facsimile machine incorporates a microcomputer 1 serving as a control section. The microcomputer 1 includes a central processing unit (CPU) 2, a random access memory (RAM) 3, a read-only memory (ROM) 4, and a voice ROM 5, all mutually connected via a bus 6. The microcomputer 1 is connected to an operation panel 7, a presentation selection switch 8, a reading unit 9, a paper detector 10, a printing unit 11, a voice reproduction unit 12, and a modulator/demodulator (modem) 13. The modem 13 is connected to a telephone line 15 via a network controller unit (NCU) 14.

The operation panel 7 acts as an input unit for the microcomputer 1. The microcomputer 1 accesses the RAM 3, the ROM 4, or the voice ROM 5 according to addresses supplied by a program or inputted by keys (not shown) of the operation panel 7, and processes the data contained therein. The presentation selection switch 8 is manipulated to choose between demonstrating the facsimile machine by voice only, by print only, or by both voice and print. The reading unit 9 reads image data of documents to be transmitted or copied. The paper detector 10 detects whether paper has been set in the facsimile machine. Presentation can be done audibly if no paper is set in the facsimile machine, or when using paper is undesirable. The printing unit 11 prints image data received from an incoming transmission or previously stored in the ROM 4. The voice reproduction unit 12 retrieves voice data stored in the voice ROM 5 and reproduces a vocal message (voice) accordingly. The modem 13 is provided for transmitting an image data via the NCU 14.

According to a control program stored in the ROM 4, the CPU 2 executes reception of incoming image data, encoding of image data for transmission, decoding of encoded or compressed image data for printing, selection of a memory to be accessed, processing of data input from the operation panel 7, and the like. Thus, the CPU 2 performing the decoding job serves as a decoding means. The RAM 3 is provided with a read buffer 31, a transmission buffer 32, a reception buffer 33, a print buffer 34, and a work area 35. The read buffer 31 temporarily stores raw image data read by the reading unit 9. The transmission buffer 32 temporarily stores compressed or encoded image data to be transmitted. The reception buffer 33 temporarily stores image data received in compressed or encoded form. The print buffer 34 temporarily stores decoded image data that is received. The work area 35 is reserved for the control program to perform processing.

The ROM 4 stores presentation data and a header in addition to the control program for controlling the facsimile machine. The presentation data is compressed at the highest rate (for example, MMR) to reduce the volume of data storage space occupied by the presentation data. When decoded into bit image form and printed out, the presentation data lists and otherwise presents the functions and features of the facsimile machine. The header is eight bytes length information used when decoding the compressed presentation data. As shown in FIG. 2, the header includes the start address where the presentation data is stored (the pointer), the encoding format, the resolution, the paper width, and the data volume. The decoding format used must correspond to the format used to compress the data. The CPU 2 must know the width of the paper (for example, A4 or B4) set in the facsimile machine in order to determine the length of each printed line. The header usually requires that the presentation data be printed out at the smallest pitch in the sub-scanning direction, i.e., superfine mode, that the facsimile machine is capable of.

The voice ROM 5 stores voice data in the form of a digital data for producing an audio presentation. The voice reproduction unit 12 reproduces a voice for the audio presentation according to the voice data.

Operations performed by a facsimile machine according to the present invention can be generally divided into a transmission mode, a reception mode, and a presentation mode.

A user first sets the read resolution in the sub-scanning direction and the encoding format before setting a document in the facsimile machine. Whether the "*" key and the "#" key have been pressed simultaneously is checked in step 1. If no, whether a document has been set in the facsimile machine is checked in step 2. If yes in step 2, whether a phone number of a remote facsimile machine has been memory-dialed, or otherwise inputted, to the numeric keypad of the operation panel 7 is checked in step 3. If no in step 3, other processes are performed in step 4. If yes, whether the start key has been pushed is checked in step 5. If yes in step 5, connection is made with a remote facsimile machine via the modem 13, the NCU 14, and the telephone line 15 in step 6. If not, the program returns to step 3.

After connection is made with a remote facsimile machine in step 6, the CPU 2 enters the transmission mode in step 7. Operations for the transmission mode include canceling out effects from static in the telephone line 15, determining the appropriate transmission mode according to the encoding format, the sub-scanning direction resolution, and the like, of the other facsimile machine. Then, the document is read in step 8 according to the resolution (the read pitch in the sub-scanning direction) indicated by the user. The read image data is sequentially stored in the read buffer 31 in step 9.

Data stored in the read buffer 31 is compression encoded in step 10 according to the encoding format selected by the user. The compressed data is stored in the transmission buffer 32 in the RAM 3 in step 11. Transmission to the remote facsimile machine starts in step 12 when the compressed data stored in the transmission buffer 32 is output to the telephone line 11 via the modem 13 and NCU 14. After all image data is transmitted, the CPU 2 terminates the connection with the remote facsimile machine in step 13 whereupon the program returns to step 1.

If, in step 2, no document is determined as set in the facsimile machine, the program proceeds to step 14 shown in FIG. 3(b). In step 14, the CPU 2 checks whether a call signal from the telephone line 15 has been detected. If no, the program returns to step 1. If yes in step 14, the facsimile machine makes a connection with the remote facsimile via the modem 13, the NCU 14 and the telephone line 15 in step 15, whereupon the CPU 2 enters the reception mode in step 16.

When the facsimile machine enters the reception mode in step 16, the effects of static are canceled out from the telephone line 15, and transmission conditions of the remote facsimile machine, such as the encoding format, and resolution in the sub-scanning direction, are determined.

Compressed image data from the remote facsimile machine is received in step 17. In step 18, the compressed image data is stored in the reception buffer 33 in the RAM 3. In step 19, the CPU 2 decodes the received image data according to the transmission conditions of the remote facsimile machine as determined in step 16. In step 20, the decoded data is stored in the print buffer 34 in the RAM 3. In step 21, the printing unit 11 prints out the decoded data stored in the print buffer 34. After all data transmitted from the remote facsimile machine has been received, the CPU 2 terminates the connection with the remote facsimile machine in step 22. The program then returns to step 1 where, as mentioned previously, whether the "*" key and the "#" key have been pressed simultaneously is checked.

If in step 1 the "*" key and the "#" key are determined as having been pressed simultaneously, the CPU 2 checks in step 23 whether the presentation selection switch 8 indicates vocally performing the presentation. If yes, then the voice data is read out from the voice ROM 5 in step 24 and presentation is performed with a vocal message produced by the voice reproduction unit 12 in step 25. If in step 23 the presentation selection switch 8 indicates that presentation should not be performed by voice message, the program proceeds to step 26 without retrieving the voice data.

In step 26, whether paper is set in the facsimile machine is determined via the paper detector 10. If no paper is detected, the program returns to step 1. If in step 26 paper is determined as set in the facsimile machine, the CPU 2 checks in step 27 whether the presentation selection switch 8 is set for the presentation to be printed out. If yes, the CPU 2 reads out the header information in step 28. According to the information in the header, the CPU 2 then finds and sets the encoding format in the work area 35 in step 29, informs the printing unit 11 of the resolution in step 30, informs the printing unit 11 of the print width in step 31, and sets in the work area 35 the lead pointer in which the lead address of the compressed data is set in step 32.

Then, the CPU 2 performs initialization of the decoding and printing processes in step 33 and decodes the compressed presentation image data for one line while taking out the compressed presentation image data on a byte-by-byte basis from the lead pointer in step 34. It is determined in step 35 whether the sub-scanning direction resolution indicated by the user and that recorded in the header are in coincidence with each other. If no, the sub-scanning direction resolution indicated by the user is given priority and thinning is performed in step 36. If yes, the program jumps to step 37 without executing the processing in step 36. In step 37, one line decoded image data is transferred to the print buffer 34 for storage therein and the image data stored therein is printed by the printing unit 11. In step 38, it is determined whether an end-of-page mark is detected. The processes in steps-34 through 37 are repeatedly carried out until the end-of-page mark is detected. Upon completion of one page printing, the program returns to step 1.

In the above description, judgement steps 14, 1, 23, 26 and 27 in combination correspond to switching means for switching between a first mode and a second mode. In the first mode which is the case when decision made in step 14 is yes, the compressed image data stored in the reception buffer 33 in the RAM 3 is decoded (step 19).

In the second mode which is the case when the decision made in step 14 is no, the decision made subsequently in step 1 is yes, and the decisions made thereafter in steps 23, 26 and 27 are all yes, compressed image data stored in the ROM 4 is decoded (step 34).

As described, the pointer is used for retrieving the compressed presentation data from the ROM 4. Because the pointer is used, the compressed presentation data can be decoded without temporarily storing it in the RAM 3 or running it through an edit RAM (not shown), yet the decoding of the compressed presentation data is achieved in the same manner as is done for the compressed image data in the reception mode. Therefore, a large amount of data can be stored in the RAM 3 without worrying about taxing the capacity of the RAM 3.

In accordance with the present invention, one page of presentation data can be printed out with different resolutions at different sections of the page so that the different resolutions can be compared when demonstrating the facsimile machine to a potential customer. For example, one section can be printed out in the fine mode and the rest in photo mode. In further accordance with the present invention, in addition to demonstrating the facsimile machine by merely transmitting messages, sales staff at sales outlets can also easily print but presentation data. The facsimile machine can be more effectively demonstrated without sacrificing a great deal of data storage space.

While the invention has been described in detail with reference to specific embodiments thereof, it would be apparent to those skilled in the art that various changes and modifications may be made therein without departing from the spirit of the invention. For example, in the preferred embodiment the ROM 4 and the voice ROM 5 are described as separate ROMs, but these could be the same ROM. Also, the presentation selection switch 8 is described as separate from the operation panel 7, but the presentation selection switch 8 could be provided as a key or combination of keys at the operation panel 7.

What is claimed is:

1. A facsimile machine, comprising:

first storage means for storing compressed image data received from a remote facsimile machine;

decoding means for decoding the compressed image data and producing decoded image data;

second storage means for storing predetermined compressed image data not received from a remote facsimile machine, the predetermined compressed image data also being decoded by said decoding means to produce decoded predetermined image data;

switching means for switching between a first mode and a second mode, the first mode causing said decoding means to decode the compressed image data stored in said first storage means, the second mode causing said decoding means to decode the predetermined compressed image data stored in said second storage means;

selection means for operator input of at least a selection of one of the first mode and the second mode;

printing means for carrying out printing on a sheet of paper set on said facsimile machine; and control means for controlling said switching means to be switched between the first mode and the second mode based on the operator input through said input means, and for further controlling said printing means to carry out printing based selectively on the decoded image data and the decoded predetermined image data.

2. The facsimile machine according to claim 1, further comprising third storage means for storing predetermined voice data, and voice reproduction means for reproducing a vocal message from the predetermined voice data, the vocal message being correlated with the predetermined image data.

3. The facsimile machine according to claim 2, wherein said selection means permits inputting a selection of an output mode from a first output mode producing a print of the received image data, a second output mode producing a print of the predetermined image data, a third output mode reproducing the vocal message, and a fourth output mode producing a print of the predetermined image data and reproducing the vocal message simultaneously.

4. The facsimile machine according to claim 3, further comprising sheet detecting means for detecting presence of the sheet of paper, and wherein said control means selects the third output mode when said sheet detecting means detects that the sheet of paper is not present and the fourth output mode had been selected using the selection means.

5. A facsimile machine as claimed in claim 1, wherein said second storage means has a storage area for further storing an encoding format information indicative of an encoding format used for producing the predetermined compressed image data, a data amount indicative of an amount of data of the predetermined compressed image data, a resolution of an image to be printed based on the predetermined image data, and a print line width information indicative of a maximum printable line length in which the predetermined image data is printed.

6. The facsimile machine according to claim 2, wherein said first storage means comprises a random access memory, said second storage means comprises a read-only memory, and said third storage means comprises a read-only memory.

7. The facsimile machine according to claim 6, wherein said random access memory has a storage location for storing the decoded image data.

8. The facsimile machine according to claim 1, wherein the predetermined compressed image data stored in the second storage means is data that demonstrates the functions of the facsimile machine.

9. The facsimile machine according to claim 2, further comprising a sheet detecting means for detecting the presence of the sheet of paper, the predetermined voice message being reproduced when the sheet detecting means detects that the sheet of paper is not present.

10. The facsimile machine according to claim 1, wherein the second storage means includes a storage area for storing information used during decoding processes of compressed image data, the compressed image data showing at least one of a group of initialization addresses, the group including addresses for coding format, data size, resolution, printing width, and predetermined image compression data.

11. A facsimile machine, comprising:
first storage means for storing compressed image data received from a remote facsimile machine;
decoding means for decoding the compressed image data and producing decoded image data;
second storage means for storing predetermined compressed image data not received from a remote facsimile machine, the predetermined compressed image data also being decoded by said decoding means to produce decoded predetermined image data;
third storage means for storing predetermined voice data;
voice reproduction means for reproducing a vocal message from the predetermined voice data, the vocal message being correlated with the predetermined image data;
switching means for switching between a first mode and a second mode, the first mode causing said decoding means to decode the compressed image data stored in said first storage means, the second mode causing said decoding means to decode the predetermined compressed image data stored in said second storage means;
selection means for operator input of a selection of at least a one of the first mode and the second mode; and
printing means for selectively receiving one of the decoded image data and the decoded predetermined image data and carrying out printing on a sheet of paper set on said facsimile machine based on the decoded image data or the decoded predetermined image data.

12. The facsimile machine according to claim 11, wherein said selection means permits inputting a selection of an output mode from a first output mode producing a print of the received image data, a second output mode producing a print of the predetermined image data, a third output mode reproducing the vocal message, and a fourth output mode producing a print of the predetermined image data and reproducing the vocal message simultaneously.

13. The facsimile machine according to claim 12, further comprising sheet detecting means for detecting presence of the sheet of paper, and wherein the third output mode is selected whenever said sheet detecting means detects that the sheet of paper is not present after initial selection of the fourth output mode.

14. A facsimile machine as claimed in claim 11, wherein said second storage means has a storage area for further storing an encoding format information indicative of an encoding format used for producing the predetermined compressed image data, a data amount indicative of an amount of data of the predetermined compressed image data, a resolution of an image to be printed based on the predetermined image data, and a print line width information indicative of a maximum printable line length in which the predetermined image data is printed.

15. The facsimile machine according to claim 11, wherein said first storage means comprises a random access memory, said second storage means comprises a read-only memory, and said third storage means comprises a read-only memory.

16. The facsimile machine according to claim 15, wherein said random access memory has a storage location for storing the decoded image data.

17. The facsimile machine according to claim 11, wherein the predetermined compressed image data stored in the second storage means is data that demonstrates the functions of the facsimile machine.

18. The facsimile machine according to claim 11, further comprising a sheet detecting means for detecting the presence of the sheet of paper, the predetermined voice message being reproduced when the sheet detecting means detects that the sheet of paper is not present.

19. The facsimile machine according to claim 11, wherein the second storage means includes a storage area for storage information used during decoding processes of a compressed image data, the compressed image data showing at least one of a group of initialization addresses, the group including addresses for coding format, data size, resolution, printing width, and predetermined image compression data.

* * * * *